(12) United States Patent
Hansen

(10) Patent No.: US 8,534,979 B2
(45) Date of Patent: Sep. 17, 2013

(54) FRONT ENTRY POWER ACCESS RAMP

(75) Inventor: Eric Hansen, Lake Orion, MI (US)

(73) Assignee: Strattec Power Access LLC, Troy, MI (US)

( * ) Notice: Subject to any disclaimer, the term of this patent is extended or adjusted under 35 U.S.C. 154(b) by 284 days.

(21) Appl. No.: 12/845,491

(22) Filed: Jul. 28, 2010

(65) Prior Publication Data

US 2011/0027054 A1    Feb. 3, 2011

Related U.S. Application Data

(60) Provisional application No. 61/229,157, filed on Jul. 28, 2009.

(51) Int. Cl.
*B60P 1/43* (2006.01)
(52) U.S. Cl.
USPC .......................................... 414/537; 414/921
(58) Field of Classification Search
USPC ................................................. 414/537, 921
See application file for complete search history.

(56) References Cited

U.S. PATENT DOCUMENTS

| | | | | |
|---|---|---|---|---|
| 4,078,678 A | * | 3/1978 | Tordella | 414/537 |
| 4,457,663 A | * | 7/1984 | Hems et al. | 414/522 |
| 4,909,700 A | * | 3/1990 | Fontecchio et al. | 414/549 |
| 5,380,144 A | | 1/1995 | Smith et al. | |
| 5,632,593 A | | 5/1997 | Aoki | |
| 5,636,399 A | | 6/1997 | Tremblay et al. | |
| 5,676,515 A | | 10/1997 | Haustein | |
| 5,832,555 A | * | 11/1998 | Saucier et al. | 14/71.1 |
| 5,838,127 A | | 11/1998 | Young et al. | |
| 6,186,733 B1 | * | 2/2001 | Lewis et al. | 414/537 |
| 6,264,416 B1 | | 7/2001 | Eaton, Jr. | |

(Continued)

FOREIGN PATENT DOCUMENTS

EP        1090619        11/2001

OTHER PUBLICATIONS

International Search Report and Written Opinion for International Application No. PCT/US2009/034507 dated Oct. 14, 2009, 7 pages.

(Continued)

*Primary Examiner* — Saul Rodriguez
*Assistant Examiner* — Jonathan Snelting
(74) *Attorney, Agent, or Firm* — Michael Best & Friedrich LLP

(57) ABSTRACT

An access system for use in a vehicle. The access system includes a frame supported on a vehicle and a ramp having a support surface and a leading edge. The ramp is moveable with respect to the frame between a stowed position, in which the leading edge of the ramp is proximate the frame, and a deployed position, in which the leading edge is positioned away from the frame. A first track and a second track are coupled to one of the frame and the ramp, where the contours of the first and second tracks at least partially define the tilt angle of the ramp with respect to the frame.

4 Claims, 8 Drawing Sheets

(56) References Cited

U.S. PATENT DOCUMENTS

| | | | |
|---|---|---|---|
| 6,357,992 B1* | 3/2002 | Ringdahl et al. | 414/545 |
| 6,470,523 B1 | 10/2002 | Sardonico | |
| 6,825,628 B2 | 11/2004 | Heigl et al. | |
| 7,121,612 B2* | 10/2006 | Rasmussen | 296/156 |
| 7,264,433 B2 | 9/2007 | Navarro | |
| 7,527,467 B2 | 5/2009 | Edwards et al. | |
| 2004/0136820 A1 | 7/2004 | Cohn | |
| 2005/0256406 A1 | 11/2005 | Barthe et al. | |
| 2006/0245883 A1 | 11/2006 | Fontaine et al. | |
| 2007/0086879 A1 | 4/2007 | Goodrich et al. | |
| 2009/0162175 A1* | 6/2009 | Pearson | 414/545 |

OTHER PUBLICATIONS

International Preliminary Report on Patentability for International Application No. PCT/US2009/034507 dated Aug. 24, 2010, 5 pages.
Savaria Side Entry for Dodge Caravan Brochure, www.savaria.com, 2010, 1 page, Canada.
Wheelchair Accessible Minivans, www.vantagemobility.com, 1 page.
BraunAbility Because Life is a Moving Experience, Entervan XT, wwwbraunability.com, 2011, The Braun Corporation, 1 page.
Wav-Evolution, Automatic Mode: 20 seconds, Autovan World Class Mobility, 1 page.

* cited by examiner

FRONT ENTRY POWER ACCESS RAMP

CROSS-REFERENCE TO RELATED APPLICATION

This application claims the benefit of and priority to U.S. Provisional Patent Application No. 61/229,157 filed Jul. 28, 2009, the entire contents of which are hereby incorporated by reference.

FIELD OF THE INVENTION

Exemplary embodiments of the present invention are generally related to systems and methods for providing improved access to vehicles for physically challenged individuals. More particularly, in one exemplary embodiment, the present invention provides an improved system requiring a reduced amount of manual effort by the user.

SUMMARY OF THE INVENTION

Exemplary embodiments of the present invention provide improved systems and methods for providing access to interior portions of a vehicle by physically challenged individuals.

In some exemplary embodiments, a wheelchair access system for a vehicle is provided. The system includes a frame assembly including a first upper track, a second upper track, a first lower track corresponding to the first upper track, and a second lower track corresponding to the second upper track. The first and second upper tracks having a first substantially linear portion and a second substantially cammed portion. The system also includes a ramp assembly having a first roller and second roller, each roller configured to engage and disengage from the upper and lower tracks as necessary, wherein upon engaging the second substantially cammed portion the rollers generally dictate the angle of the ramp assembly with respect to the frame assembly.

In other exemplary embodiments, a wheelchair access system for a vehicle is provided. The system includes a frame assembly. The system also includes a ramp assembly moveable with respect to the frame assembly between a deployed and stowed position. The system also includes an actuation system operatively coupled to the frame assembly and the ramp assembly, wherein the actuation assembly includes a jackscrew and a drive nut, and wherein the drive nut includes a magnet able to communicate with a Hall Effect sensor to determine when the drive nut is in the stored or deployed positions.

In some exemplary embodiments, an access system for use in a vehicle is provided. The access system comprises a frame supported on the vehicle and a ramp having a support surface and a leading edge. The ramp is moveable with respect to the frame between a stowed position, in which the leading edge of the ramp is proximate the frame, and a deployed position, in which the leading edge is positioned away from the frame. The access system also comprises a first track and a second track. The first and second tracks are attached to one of the frame and the ramp, where the first track includes a first contact surface and the second track opposes the first track and includes a second contact surface, and where at least one of the first contact surface and the second contact surface at least partially define a tilt angle. The tilt angle corresponds to an angle defined between the support surface of the ramp and an axis of travel of the ramp during travel between the stowed position and a tilted position when the ramp is in an inclined deployed position, in which the leading edge is moved toward ground. The access system also comprises a follower coupled to an other of the frame and the ramp. The follower being engageable with at least one of the first track and the second track to guide movement of the ramp between the stowed position and deployed position.

In some exemplary embodiments, an access system for use in a vehicle is provided. The access system comprises a frame engageable with the vehicle and a ramp having a support surface and a leading edge. The ramp being moveable with respect to the frame between a stowed position, in which the leading edge is proximate the frame, and a deployed position, in which the leading edge is spaced from the frame. The access system also comprises a track couplable to one of the frame and the ramp, the track having a cammed portion. The access system also comprises a follower couplable to an other of the frame and the ramp, the follower being engageable with the track. The access system also comprises an actuation assembly coupled to the ramp to move the ramp between the stowed position and the deployed position, where the actuation assembly includes a sensor to record a position of the ramp with respect to the frame.

In some exemplary embodiments, an access system for use in a vehicle is provided. The access system comprises a frame supported on the vehicle and a ramp having a support surface and a leading edge. The ramp being moveable with respect to the frame assembly between a stowed position, in which the leading edge is positioned proximate the frame, a deployed position, in which the leading edge is positioned away from the frame, and one or more tilted positions, in which the ramp defines a unique tilt angle in each tilted position. The tilt angle corresponds to an angle defined between the support surface of the ramp and an axis of travel of the ramp during travel between the stowed position and a tilted position when the ramp is in an inclined deployed position, in which the leading edge is moved toward ground. The access system also comprises a first track and a second track opposed from the first track, where the first and second tracks are coupled to one of the frame and the ramp, and where the contours of the first and second tracks at least partially define the tilt angle. The access system also comprises a first follower and a second follower, where the first and second followers are coupled to an other of the frame and the ramp, and where the first follower and the second follower are configured to alternately engage and disengage at least one of the first track and the second track.

The above-described and other features and advantages will be appreciated and understood by those skilled in the art from the following detailed description, drawings, and appended claims.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

Figure 1:
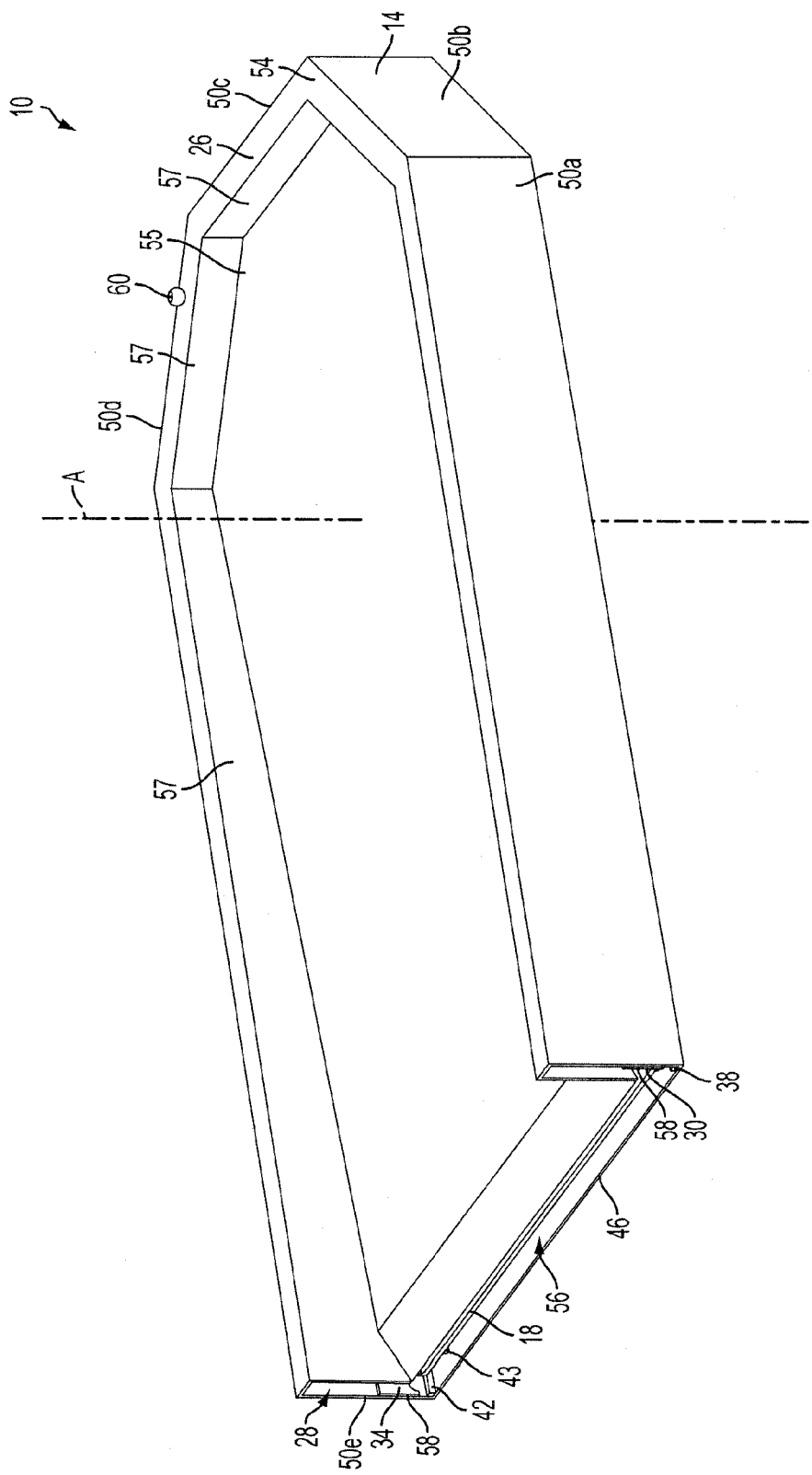
FIG. 1 illustrates a perspective view of a wheelchair access system in a stowed position according to one exemplary embodiment of the present invention.
Figure 1A:
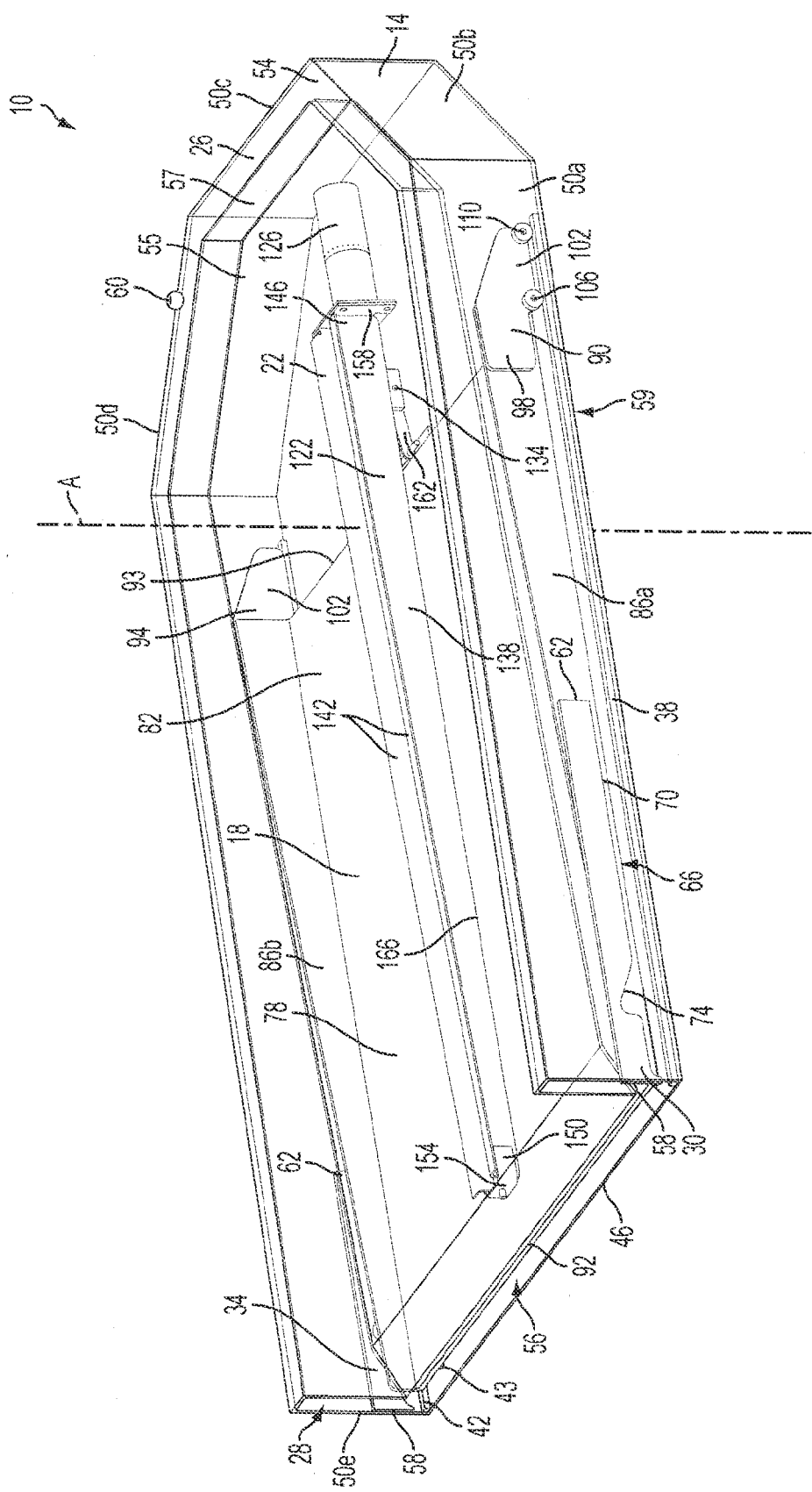
FIG. 1a is a perspective view of the wheelchair access system of FIG. 1 with the housing made transparent to illustrate the internal elements.

Exemplary embodiments of the present invention provide improved systems and methods for providing access to interior portions of a vehicle for physically challenged individuals. In some exemplary embodiments, the improved systems and methods are through the formation of a wheelchair access system having an actuator driven ramp to reduce the amount of manual effort required to deploy the ramp. In other exemplary embodiments, the improved system and method include the use of a cam surface to vertically position the ramp in the deployed position.

Through the above referenced features, and other features shown and described herein, the wheelchair access system provides an improved system requiring a reduced amount of manual effort by the user.

Referring to FIGS. 1-7, exemplary embodiments of a wheelchair access system 10 are shown. Generally, the system 10 includes a frame assembly 14, a ramp assembly 18 coupled to the frame assembly 14 and moveable between a stowed position and a deployed position, and an actuation assembly 22 operatively coupled between the ramp 18 and frame assembly 14. In some specific embodiments of the invention, the wheelchair access system 10 is coupled to a control system (not shown) able to manage, among other things, the speed and relative position of the ramp assembly 18 during deployment and stowing.

The frame assembly 14 of the wheelchair access system 10 is adapted to be rotatably mounted to a modified floor pan of a motor vehicle (not shown). Typically, the floor pan of the vehicle is removed and lowered, in general between 8"-12", and the frame assembly 14 is mounted to the floor pan to pivot about an axis A. In some exemplary embodiments, the current invention may be positioned in the driver or passenger areas of the vehicle in place of or adjacent to a standard seat. Once mounted, the frame assembly 14 is able to pivot generally 90 degrees about axis A between a loading position, where the frame assembly 14 is facing out of a door opening, and a driving position, where the frame assembly 14 is facing the direction of vehicle travel.

The frame assembly 14 is configured to support the ramp assembly 18 when an individual is entering and exiting the vehicle, and store the ramp assembly 18 when it is in the stowed position. In addition, the frame assembly 14 provides support and stability for the user once the individual is in the car. The frame assembly 14 may include locking provisions (not shown) to facilitate incorporation of standard wheelchair securing devices.

In further detail, the frame assembly 14 comprises a housing 26, a first upper track 30 positioned within the housing 26, a second upper track 34 positioned within the housing 26 opposite the first upper track 30, a first lower track 38 corresponding to the first upper track 30, a second lower track 42 corresponding to the second upper track 34, and one or more front supports 43 able to support the ramp assembly 18. In some exemplary embodiments, the frame assembly 14 may include one or more travel stops (not shown) to limit the travel of the ramp assembly 18 with respect to the frame assembly 14. In other exemplary embodiments, the frame assembly 14 may include a powered conveyance assist (not shown), such as a winch and the like, to convey the wheelchair up the ramp assembly 18.

Best shown in FIGS. 1, 1a, 3, and 4, the housing 26 includes a storage volume 28 defined by a bottom panel 46, a plurality of side panels 50a, b, c, d, e extending substantially perpendicular the bottom panel 46, a top panel 54 extending inwardly a distance from the side panels 50a, b, c, d, e, and a floor panel 55 positioned above and forming an angle 52 with respect to the bottom panel 46. The housing 26 further includes a substantially vertical side wall 57 extending between the top panel 54 and the floor panel 55. In addition, the housing 26 defines an opening 56 through which the ramp assembly 18 may ingress and regress from the storage volume 28. The housing 26 provides a protective environment for some components of the wheelchair access system 10, and in some exemplary embodiments, may include a door or other manner of sealing (not shown) to seal opening 56 and isolate the storage volume from the surrounding elements.

In some exemplary embodiments, the bottom surface 59 of the bottom panel 46 is coupled to one or more mounting brackets (not shown) to allow the housing 26 to rotate about axis A with respect to the vehicle. The frame assembly 14 may also include reinforcements (not shown) to provide additional strength if necessary to support large loads. In other exemplary embodiments, the frame assembly 14 may include additional mounting locations 60 to facilitate the coupling of actuators, sensors, harnesses, and the like to the frame assembly 14.

The floor panel 55 of the housing 26 is configured to support the wheelchair of the user during loading, unloading, and operation of the vehicle. When in the loading position, the opening 56 of the housing 26 faces out the door of the vehicle to allow the ramp assembly 18 to be deployed and the user to enter the vehicle.

Once the user and wheelchair are positioned on the floor panel 55 and the ramp assembly 18 is in the stowed position, the housing rotates generally 52 degrees so that the opening 56 and the wheelchair, are facing the direction of travel. In the illustrated construction, the side walls 57 may act as guides to assure the wheelchair is properly positioned on the frame assembly 14. Further, additional guides (not shown) may be employed on the floor panel 55 to aid in positioning the wheelchair on the floor panel 55. In another exemplary embodiment, the floor panel 55 may include one or more recesses shaped and sized to receive a portion of a wheel of the wheelchair to better assure stability during operation of the motor vehicle. In the current embodiment, the weight of the user and the wheelchair are transferred from the floor panel 55, up the side walls 57, along top panel 54, down the side panels 50a, b, c, d, e, and into the bottom panel 46.

The opening 56 of the housing is substantially "U" shaped to correspond to the general shape of the ramp assembly 18. In some exemplary embodiments, the opening 56 may include any shape substantially corresponding to the shape of the frame apparatus to be deployed. In the illustrated embodiment of FIGS. 1-7, the opening 56 is shaped to provide a smooth transition between the floor panel 55 and the base 82 (described below) of the ramp assembly 18. Further, the shape of the opening 56 allows reinforcing entities (e.g., side walls 86) to pass through the opening without disrupting the alignment between the base 82 and the floor panel 55.

The housing 26 may be formed of any suitable material configured for providing support to the ramp and optionally attachment of the wheelchair access system to a vehicle. For example, suitable materials that may be used to form the frame assembly include metal, plastic, rubber, ceramics, combinations thereof or otherwise. In one exemplary embodiment, the material forming the frame assembly comprises a metal such as aluminum, stainless steel, or otherwise. In another exemplary embodiment, the material forming the frame assembly comprises a high strength plastic. Such plastic may include one or more reinforcement features such as fibers, or otherwise, for providing improved strength and durability of the frame assembly.

Illustrated in FIGS. 1a, and 3-5, the first upper track 30 and the second upper track 34 are coupled to side panel 50a and side panel 50e, respectively, each extending at least a portion of the length of the housing 26 to define a forward edge 58 proximate the opening 56, a rearward edge 62 opposite the forward edge 58, and a supporting edge or contact surface 66 spanning between the forward edge 58 and the rearward edge 62. Each upper track member 30, 34 is configured to at least partially guide the ramp assembly 18 during operation of the wheelchair access system 10.

Figure 5:
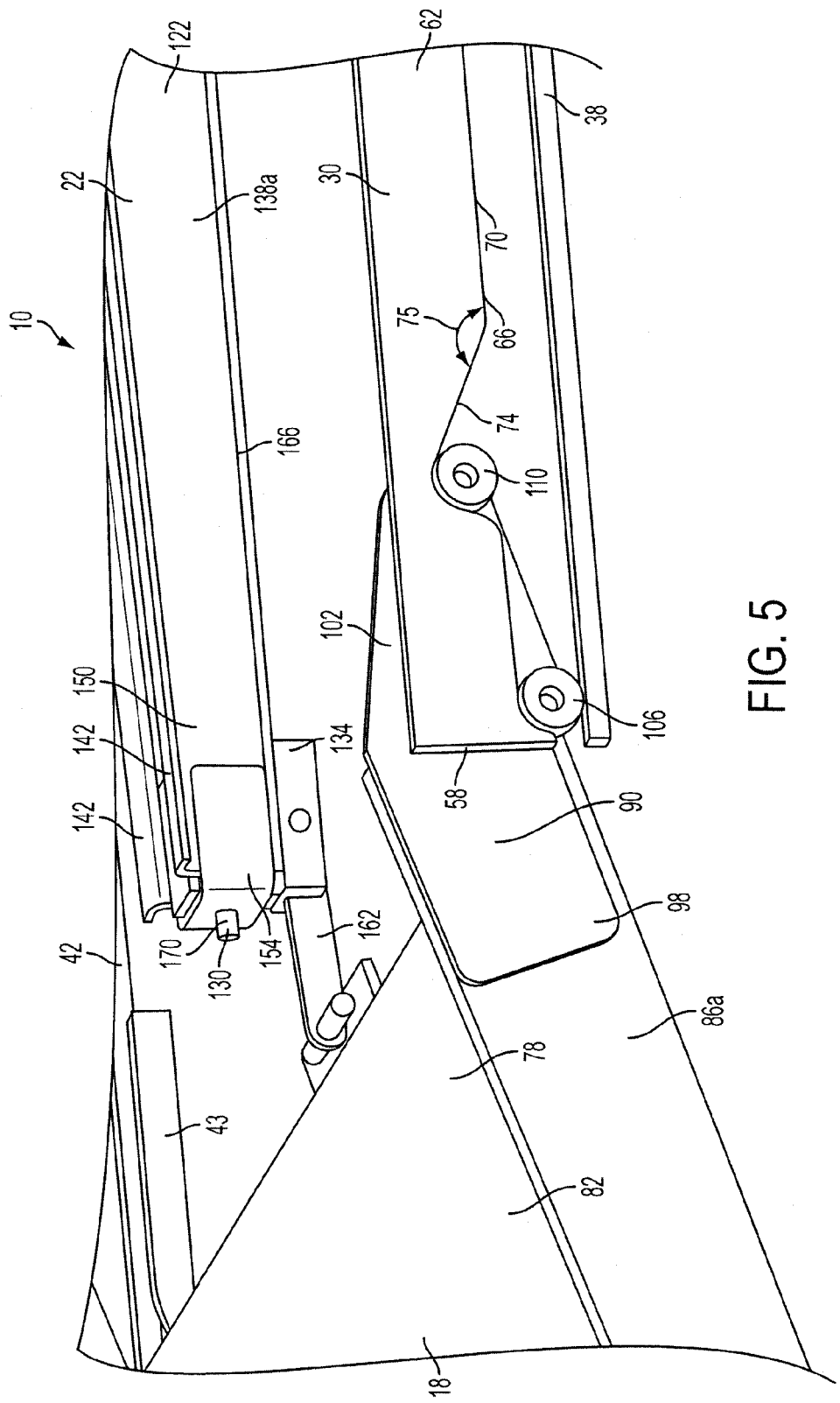
FIG. 5 illustrates a detailed perspective view of the upper track according to one exemplary embodiment of the present invention.
Figure 6:
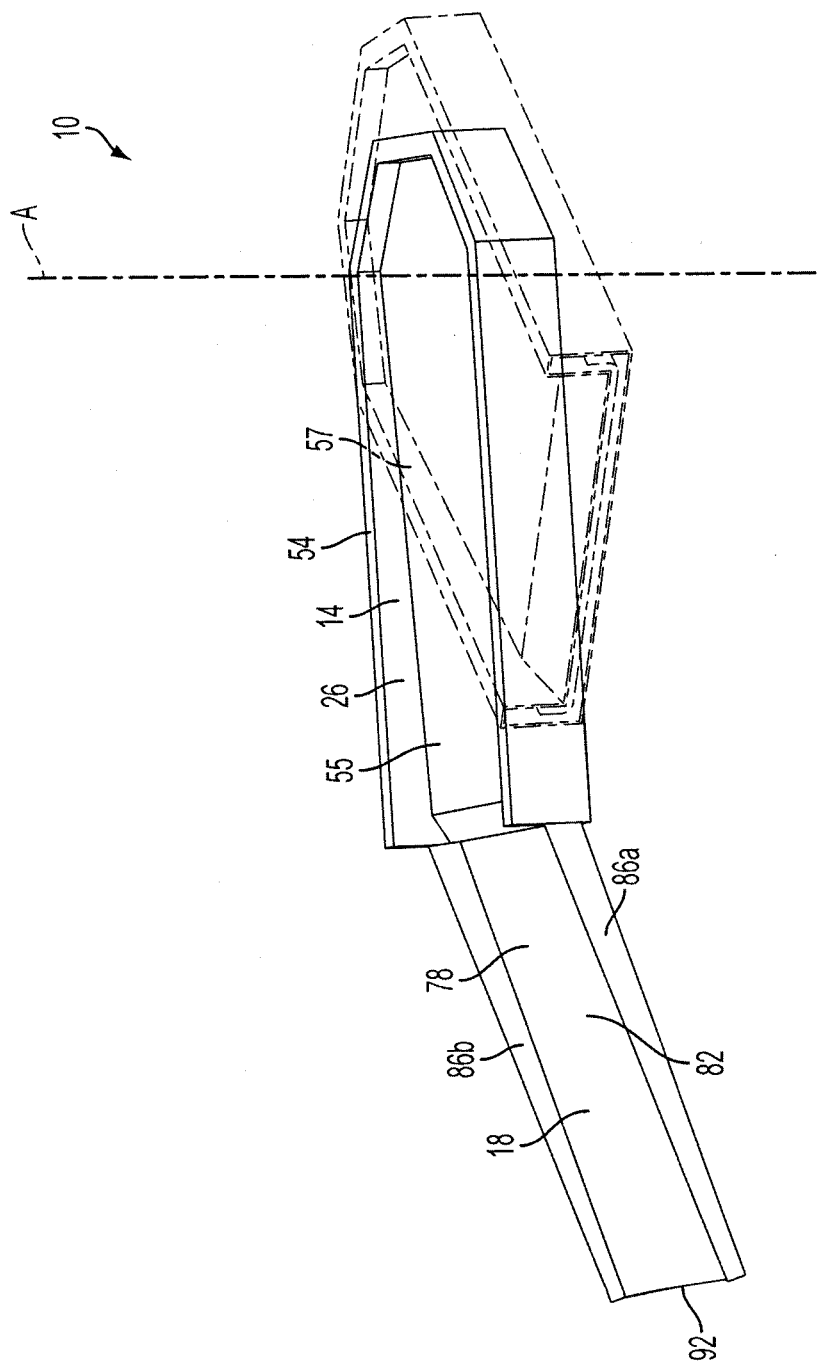
FIG. 6 illustrates a perspective view of a wheelchair access system in various stages of deployment according to one exemplary embodiment of the present invention.
Figure 7:
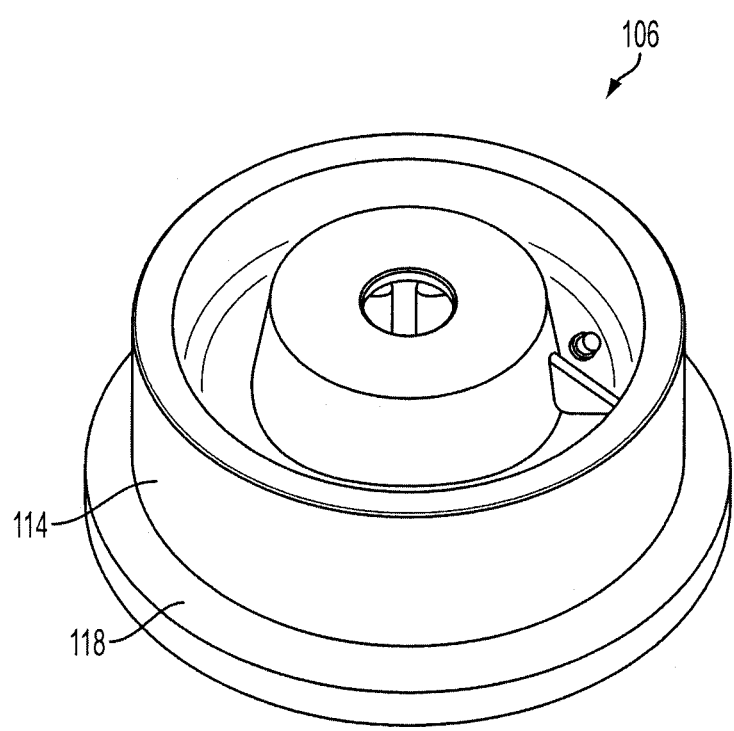
FIG. 7 illustrates a perspective view of a roller according to one exemplary embodiment of the present invention.

In the illustrated embodiment, the supporting edge 66 includes a first substantially linear portion 70 and a second generally cammed portion 74 (FIG. 5). During operation of the system 10, the upper tracks 30, 34 are configured to at least partially define a tilt angle. The tilt angle corresponds to the angle defined between the support surface of the base 82 of the ramp 78 and an axis of travel of the ramp 78 during travel between the stowed position and a tilted position when the ramp 78 is in an inclined deployed position, in which the forward edge 92 is moved toward the ground. More specifically, the rearward roller 110 (described below) engages and traverses along the supporting edge 66 of the corresponding upper track 30, 34, where fluctuations in the contour of the supporting edge 66 generally result in fluctuations in the tilt angle.

In the illustrated embodiment, the second portion 74 is cammed such that as the rearward roller 110 engages the second portion 74 while traveling towards the forward edge 58 of the upper track 30, 34 (i.e., the ramp is being deployed), the ramp assembly 18 is generally angled further downward towards a ground surface surrounding the vehicle. In contrast, as the rearward roller 110 engages the second portion 74 while traveling towards the rearward edge 62 of the upper track 30, 34 (i.e., the ramp is being stowed) the ramp assembly 18 is drawn vertically upwardly or away from the ground surrounding the vehicle until substantially parallel with the bottom panel 46.

In some specific embodiments, the contour of the second portion 74 may be altered to provide a desired rate of decent, ascent, and/or maximum final tilt angle. More specifically, the cammed surface can be cut deeper into the upper tracks 30, 34 to allow for greater tilt angles. Further, the angle at which the cut reaches the final depth (angle 75) determines the rate at which the ramp assembly 18 will rotate. In addition, it is to be appreciated that in the illustrated embodiment the rearward roller 110 may disengage from the supporting edge 66 if the forward edge 92 (described below) of the ramp assembly 18 contacts the ground, floor, other surrounding objects, or reaches a predetermined tilt angle before the actuation assembly 22 has completed its cycle. As such, the present invention will not force the frontward edge 92 of the ramp 78 into the ground but rather allow the ramp 78 to freely pivot as necessary and conform to it. This attribute allows the ramp assembly 18 to adapt to varying vehicle heights without causing potential damage to the actuation assembly 22 or frame assembly 14.

In some exemplary embodiments, the upper tracks 30, 34 may include "C" channels completely encompassing the frontward or rearward rollers 106, 110. In some such embodiments, each roller may traverse the same track, or multiple tracks may be used, each corresponding to a specific roller. Further, the upper and lower tracks 30, 34, 38, 42 may include anti-rattle provisions to reduce unnecessary shaking or noise during operation of the system 10 or vehicle.

The frame assembly 14 also includes a first lower track 38 and a second lower track 42 each positioned on the bottom panel 46 and extending at least a portion of the length of the housing 26. The first lower track 38 and second lower track 42 each include a supporting edge or contact surface (see above) and are configured to correspond with the first upper track 30 and second upper track 34, respectively. The lower tracks 38, 42 guide and support the rollers 106, 110 of the ramp assembly 18 during operation of the wheelchair access system 10. In the illustrated embodiment, the first and second lower tracks 38, 42 are vertically aligned with the first and second upper tracks 30, 34, respectively, to allow the rollers 106, 110 to disengage and engage between the lower tracks and the upper tracks if necessary. In some exemplary embodiments, the first and second lower tracks 38, 42 are aligned with the first and second upper tracks 30, 34, respectively, in a direction substantially perpendicular to a direction of travel of the ramp 78 between the deployed and stowed positions. In other exemplary embodiments, the lower tracks 38, 42 may include one or more stops (not shown) to limit the extent the rollers 106, 110 can traverse along the track. Similar to the upper tracks 30, 34, variations in the contour of the lower tracks 38, 42 may at least partially define the tilt angle. In still other exemplary embodiments, the tracks may include "C" channels receiving at least one of the pair of rollers 106, 110.

The one or more front supports 43 are generally positioned on the bottom panel 46 proximate the opening 56 and configured to support the ramp assembly 18. In the illustrated embodiment, the one or more front supports 43 include plastic guides. However, in some exemplary embodiments, the front supports may include rollers, metal guides, and the like. In some additional exemplary embodiments, the one or more front supports 43 may be supplemented with a secondary anti-rattle device (not shown) to eliminate unnecessary shaking and noise during operation of the system 10 or vehicle.

Illustrated in FIGS. 1, 1a, 3, and 4, the ramp assembly 18 is coupled to the frame assembly 14 and positionable between a stowed position (FIG. 1), in which the forward edge 92 of the ramp 78 is proximate the frame 14, a deployed position (FIG. 3), in which the forward edge 92 is positioned away from the frame 14, and one or more tilted positions, in which the ramp 78 defines a unique tilt angle in each tilted position. The ramp 78 is also moveable between a tilted deployed position and a plurality of additional tilted deployed positions. Where the tilt angle for each tilted deployed position is unique. The ramp assembly 18 has suitable strength to support individuals entering and exiting a vehicle and, when deployed, is a sufficient length to span generally between the floor panel 55 and a ground surface surrounding the vehicle. More specifically, the ramp assembly 18 has sufficient length to span generally between the floor panel 55 and the ground surface producing a grade passable by persons operating a wheelchair.

The ramp assembly 18 includes a ramp 78 having a base 82 with a support surface, a first wall 86a extending substantially perpendicular to the base 82, and second side wall 86b extending substantially perpendicular to the base 82 opposite the first wall 86*a*. The ramp assembly 18 further includes a first support member 90 coupled to the first side wall 86*a* extending beyond the base 82, and a second support member 94 coupled to a second wall 86*b* and extending beyond the base 82. In some exemplary embodiments, the ramp assembly 18 may include reinforcements to provide additional strength for large load applications. In other exemplary embodiments, the ramp assembly 18 may include one or more guide rails (not shown) to position the wheelchair on the ramp assembly 18. In some such embodiments, the guide rails may be collapsible.

The ramp 78 of the ramp assembly 18 includes a base 82 having a forward or leading edge 92 and a rearward edge 93, a first side wall 86*a* extending substantially perpendicular to the base 82, and a second side wall 86*b* extending substantially perpendicular to the base 82 opposite the first side wall 86*a*. The first and second side walls 86*a, b* provide rigidity to the ramp 78 while acting as outermost guides to assure the wheels of the wheelchair remain on the base 82 while the user is entering or leaving the vehicle. The shape of the ramp is suitable for being stowed within the storage volume 28 of the frame assembly 12.

In the illustrated embodiment, the base 82 of the ramp 78 is substantially planar, however in exemplary embodiments, the base 82 may include curved surfaces to produce a smoother transition between the ground and the floor panel 55. In yet more exemplary embodiments, the ramp 78 may include sensors able to detect the presence of a wheelchair or person. In other exemplary embodiments, the ramp 78 may include multiple hinged sections able to fold back upon one another to produce a longer overall ramp for vehicles with higher ride heights while maintaining the ability to be stowed in the storage volume 28.

The ramp assembly 18 further includes a first support member 90 and a second support member 94 each coupled to the first and second side walls 86*a, b*, respectively, and extending beyond the rearward edge 93 of the base 82. Each supporting member 90, 94 includes a forward end 98 coupled to a respective side wall 86*a, b*, rearward end 102 opposite the forward end 98, a first frontward roller or follower 106, and a second rearward roller or follower 110. In some exemplary embodiments, the first and second support members 90, 94 may be removably coupled to the ramp 78 (e.g., by fasteners) for ease of maintenance.

In some specific constructions, each roller 106, 110 includes a hub 114 with an outer diameter smaller than the distance between the upper and lower tracks 30, 34, 38, 42. In some exemplary embodiments, the rollers 106, 110 may include one or more flanges 118 extending radially from the hub 114 to axially secure the roller to the upper and lower tracks 30, 34, 38, 42. In the illustrated embodiment, each roller 106, 110 is able to engage and disengage the tracks as necessary during operation of the wheelchair access system 10. In some specific embodiments, the flange 118 may be large enough to contact both the upper and lower tracks simultaneously to avoid complete disengagement of the rollers 106, 110 and possible damage to the system 10.

In the illustrated embodiment, each roller 106, 110 is coupled to its respective support member 90, 94 by an axel and bearing assembly, however in alternate embodiments, any form of rotational coupling may be utilized. Each roller 106, 110 is able to support the combined weight of the ramp and an individual entering and exiting the vehicle. In still other alternate embodiments, the forward and rearward rollers 106, 110 may include, but are not limited to a pin, a gear, a low friction pad, and the like.

Although the present invention is illustrated with the tracks 30, 34, 38, 42 coupled to the frame assembly 14 and the rollers 106, 110 coupled to the ramp assembly 18. In alternate embodiments, the rollers 106, 110 may be coupled to the ramp assembly 18 and the tracks 30, 34, 38, 42 may be coupled to the frame assembly 14.

Figure 2:
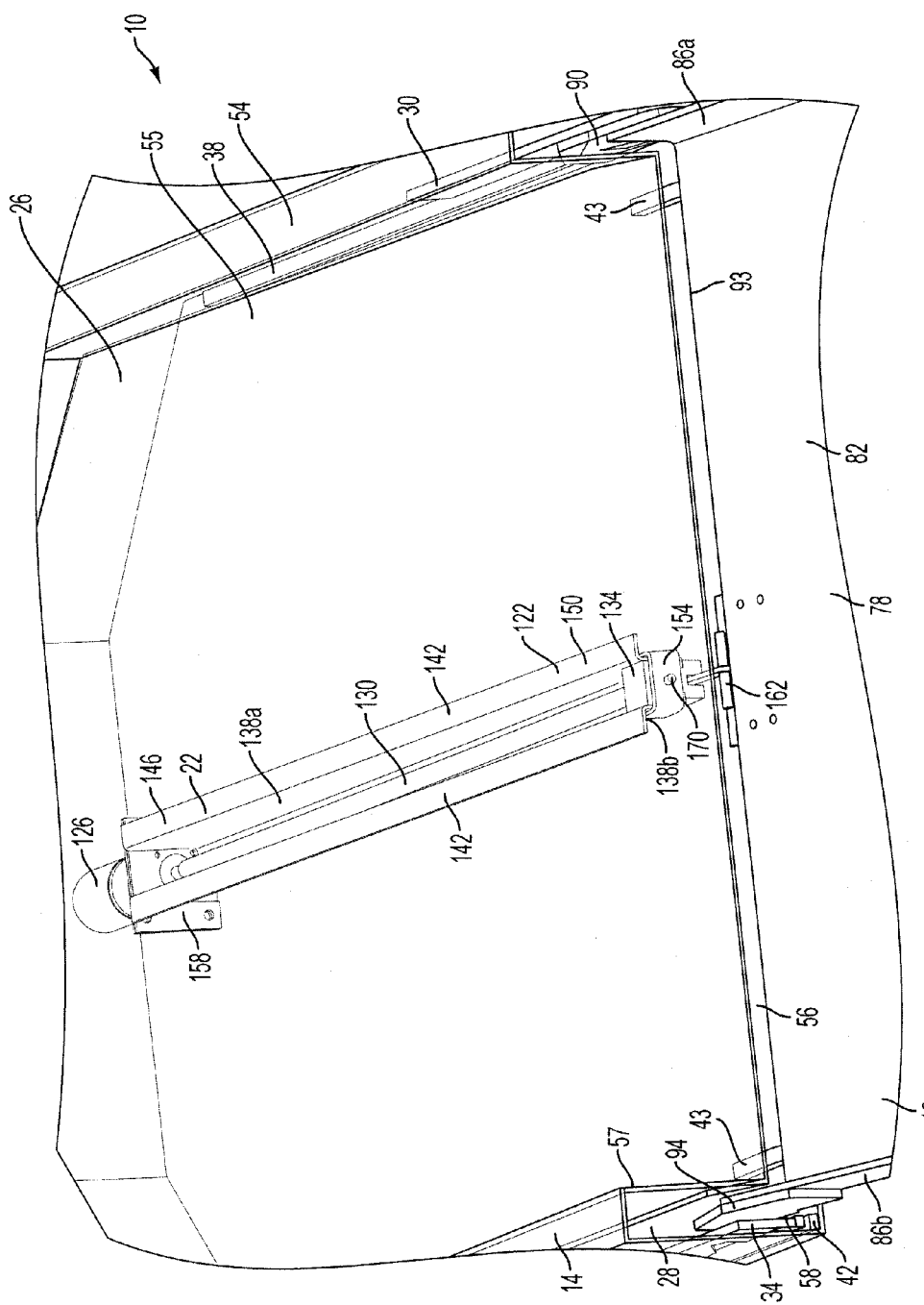
FIG. 2 illustrates a perspective view of the actuator assembly of a wheelchair access system according to one exemplary embodiment of the present invention.
Figure 3:
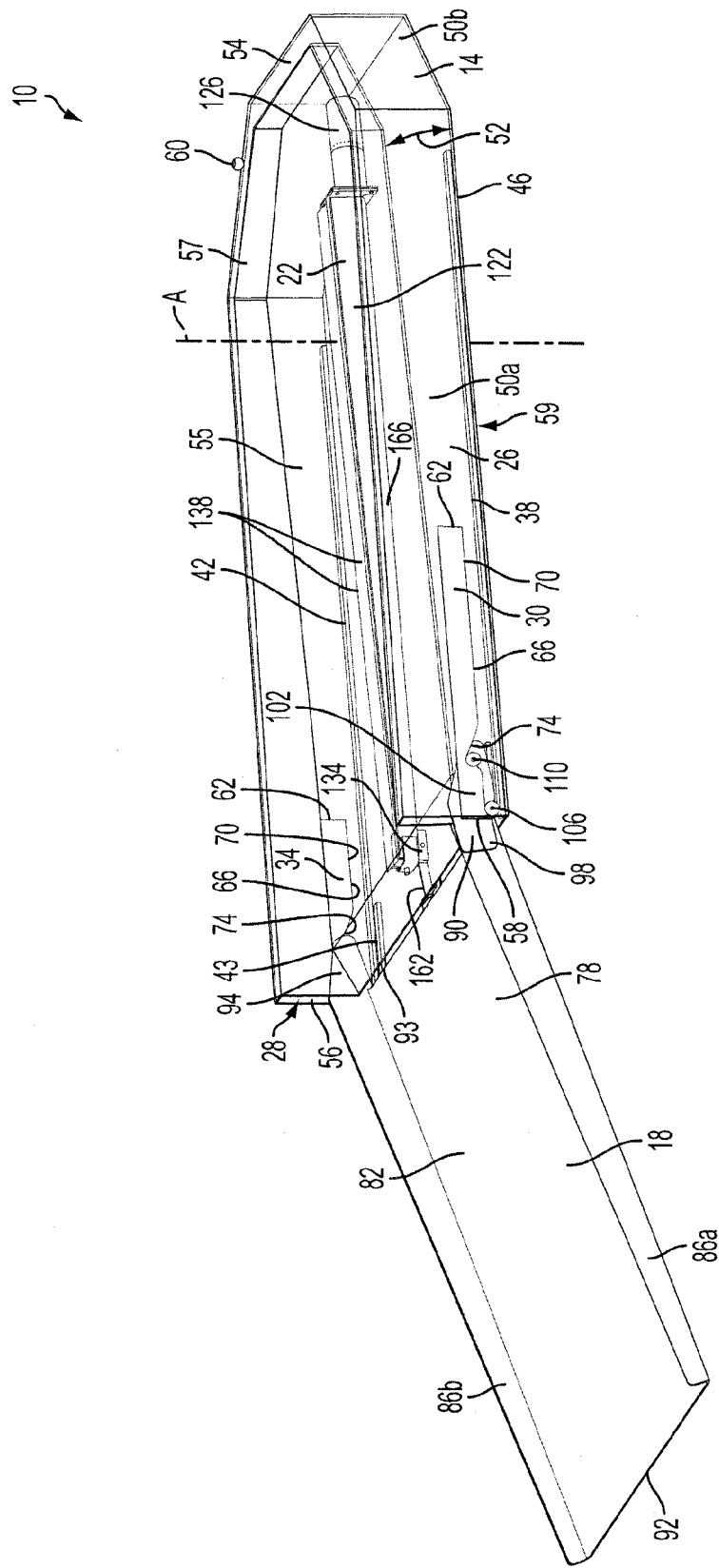
FIG. 3 illustrates a perspective view of a wheelchair access system in a deployed position according to one exemplary embodiment of the present invention.

Best illustrated in FIG. 2, the actuation assembly 22 is operatively coupled to and biases the ramp assembly 18 between the stowed and deployed positions. The actuation assembly 22 includes an elongated frame 122 coupled to the bottom surface of the floor panel 55 and extending at least a portion of the length of the housing 26, a motor assembly 126 coupled to the frame 122, a jackscrew 130 pivotably coupled to the frame 122 and driven by the motor assembly 126, and a drive nut 134 threadably coupled to the jackscrew 130.

In some exemplary embodiments, the actuation assembly 22 may be coupled to a controller assembly. In such embodiments, the controller assembly could manage the deployment speed, final deployment position, stow speed, final stow position and the like. In some exemplary embodiments, the actuation assembly 22 may include a linear actuator, cable and pulley system, gear and piston system, and the like.

The frame 122 of the actuation assembly 22 comprises two substantially parallel walls 138*a, b* each having a flange 142 coupleable to the lower surface of the floor panel 55. In the illustrated embodiment, the walls 138*a, b* taper as they extend from the rearward end 146 to the frontward end 150 substantially corresponding to the angle 52 between the floor panel 55 and the bottom panel 46. As a result, the bottom edge 166 remains a substantially constant distance from the bottom panel 46. In some exemplary embodiments, the frame 122 includes an endcap 154 to receive a distal end 170 of the jackscrew 130. In yet other exemplary embodiments, the walls 138*a, b* include a second set of flanges 158 configured to be coupled to the motor assembly 126. The walls 138*a, b* of the actuation assembly 22 are positioned a distance apart substantially corresponding to the width of the drive nut 134. As such, the walls 138*a, b* are able to restrict the nut 134 from rotating with respect to the frame 122 forcing the drive nut 134 to traverses along the length of the jackscrew 130.

The motor assembly 126 is coupled to the rearward end 146 of the walls 138*a, b* by the second set of flanges 158. During operation of the system 10, the motor assembly 126 rotates the jackscrew 130 to position the drive nut 134 at desired positions along the length of the jackscrew 130. In some specific embodiments, the motor assembly 126 may include a gear reduction between the motor and the jackscrew 130 to increase the torque applied to the drive nut 134. Optionally, in one exemplary embodiment, motor 126 also includes a clutch for disengagement of the drive motor from the jackscrew 130 to allow for manual deployment or stowage of ramp 78. Further, the clutch may be deployed to protect the motor or system 10 from becoming damaged if a large force is exerted on the ramp assembly 18. Other clutch configurations are contemplated.

The drive nut 134 of the actuator assembly 22 is threadably coupled to and traverses along the length of the jackscrew 130. The drive nut 134 positions the ramp assembly 18 with respect to the frame assembly 14 by way of a joining member 162 pivotably coupled to the drive nut 134 and the rearward edge 93 of the ramp 78.

In some exemplary embodiments, the drive nut 134 may include an embedded rare earth magnet (not shown) to correspond with a Hall Effect switch positioned on the frame assembly 14 or actuator assembly 22. In some exemplary embodiments, the magnet and Hall Effect switch may provide a signal when the drive nut 134 is in the deployed position or the stowed position. In other exemplary embodiments, a quadrature sensor may be positioned on the jackscrew 130, motor 126, or gear reduction to provide the relative speed and direction of the drive nut 134. In addition, the information gathered by the Hall Effect switch and quadrature sensor may be further transferred to an external control system. In yet other exemplary embodiments, the drive nut 134 may be coupled to a linear position transducer to measure position and speed.

To deploy the ramp assembly 18, the user rotates the frame assembly 14 into the loading position (FIG. 6), thereby positioning the opening 56 towards a door opening. The actuation assembly 22 is activated, energizing the motor assembly 126 to rotate the jackscrew 130 and bias the drive nut 134 from the stowed position (i.e., proximate the rearward end 146 of the walls 138*a, b*) towards the distal end 170 of the jackscrew 130. The drive nut 134 transmits power to the ramp assembly 18 through the joining member 162 and the ramp assembly 18 begins to exit the opening 56. Initially the frame assembly 18 originates in the stowed position (FIG. 1) with the frame assembly center of gravity positioned rearward of the front supports 43 and both the forward 106 and rearward 110 rollers engaging the lower tracks 38, 42.

As the ramp assembly 18 continues to exit the opening 56, the center of gravity passes over the front support 43 and the rearward rollers 110 disengages from the lower tracks 38, 42 and engages the upper tracks 30, 34. As a result, the weight of the ramp assembly 18 is supported between the downward force exerted on the lower tracks 38, 42 by the frontward rollers 106 and the upward forced exerted on the upper tracks 30, 34 by the rearward rollers 110.

Figure 4:
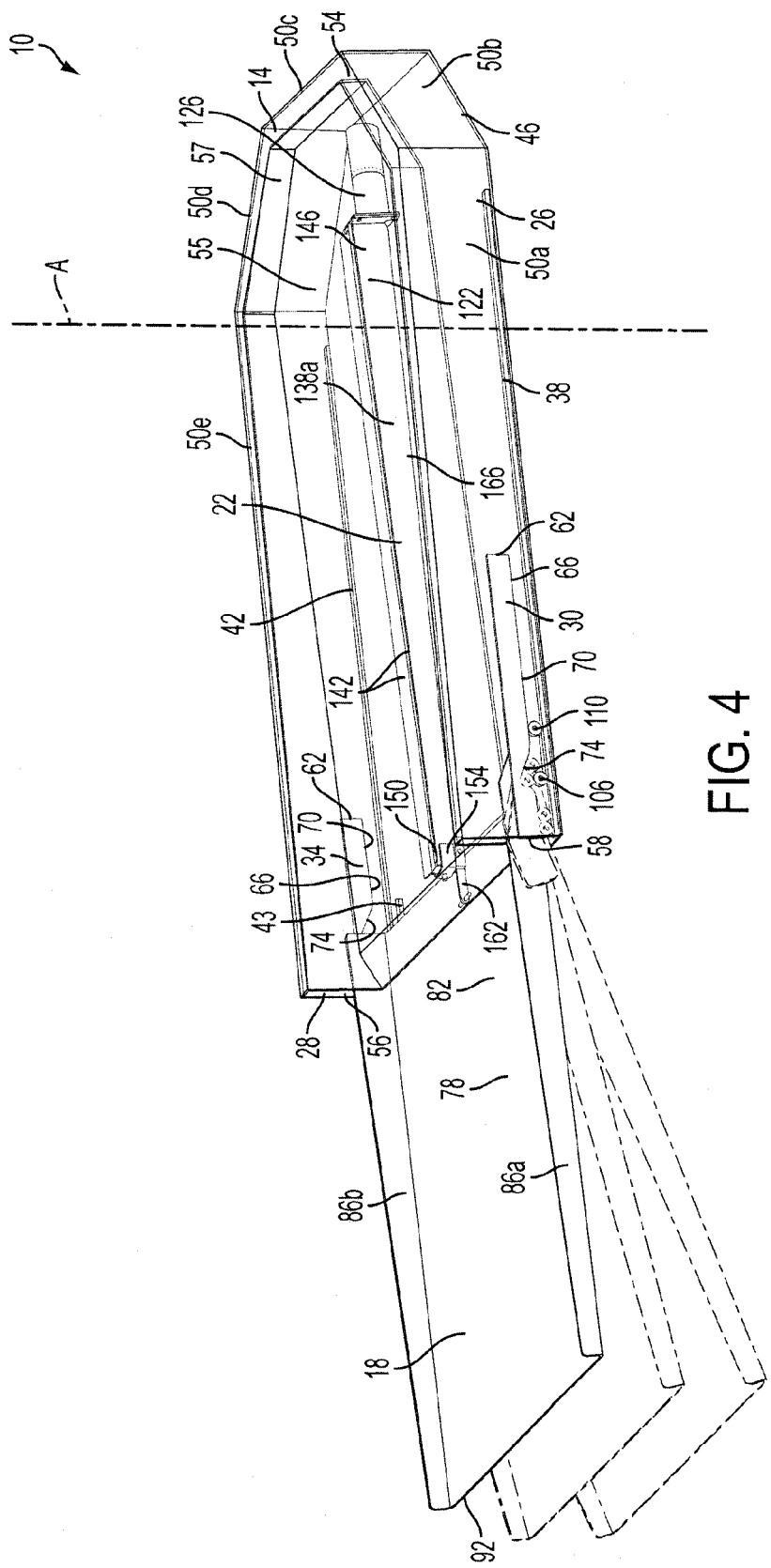
FIG. 4 illustrates a perspective view of a wheelchair access system in multiple states of deployment according to one exemplary embodiment of the present invention.

As the ramp assembly 18 continues to exit the opening 56, the rearward roller 110 enters the second portion 74 of the upper tracks 30, 34 (FIG. 4). As a result, any upward movement of the rearward roller 110 into the second portion 74 results in the frontward edge 92 of the ramp 78 moving vertically downwardly towards a ground surface. Once the frontward edge 92 of the ramp 78 contacts the ground, at least one of the rollers 106, 110 may disengage from the tracks so no additional rotation occurs. Once the drive nut 134 reaches the distal end 170 of the jackscrew 130, the motor assembly 126 deactivates and the ramp comes to rest in the deployed position (see FIG. 3).

To return the ramp assembly 18 into the stowed position, the deployment operation (see above) is operated in reverse order. More specifically, the drive nut 134 traverses from the distal end 170 of the jackscrew 130 towards the rearward end 146 of the walls 138*a, b*. Once the ramp assembly 18 is positioned substantially within the storage volume 28 (e.g., in the stowed position), the frame assembly 14 may be rotated about axis A into the driving position.

While exemplary embodiments have been described and shown, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the invention not be limited to the particular embodiments disclosed as the best mode contemplated for carrying out this invention, but that the invention will include all embodiments falling within the scope of the appended claims.

The invention claimed is:

1. An access system for use in a vehicle, the access system comprising:
   a frame supported on the vehicle, the frame including a housing having a bottom panel and a floor panel positioned above the bottom panel, the floor panel being inclined relative to the bottom panel to form an angle relative to the bottom panel;
   a ramp having a support surface and a leading edge, the ramp being moveable with respect to the frame assembly between a stowed position, in which the leading edge is positioned proximate the frame, a deployed position, in which the leading edge is positioned away from the frame, and one or more tilted positions, in which the ramp defines a unique tilt angle in each tilted position, the tilt angle corresponding to an angle defined between the support surface of the ramp and an axis of travel of the ramp during travel between the stowed position and a tilted position when the ramp is in an inclined deployed position, in which the leading edge is moved toward ground;
   a first track and a second track opposed from the first track, wherein the first and second tracks are coupled to one of the frame and the ramp, wherein each of the first and second tracks defines a contour, and wherein the contours of the first and second tracks at least partially define the tilt angle;
   a first follower and a second follower, wherein the first and second followers are coupled to an other of the frame and the ramp, and wherein the first follower and the second follower are configured to alternately engage and disengage at least one of the first track and the second track; and
   an actuation assembly including an elongated frame coupled to a bottom surface of the floor panel, a jackscrew positioned within the elongated frame, and a drive nut coupled to the ramp and threadably coupled to and moveable along the jackscrew to move the ramp between the stowed position and the deployed position, wherein the elongated frame is tapered to correspond to the angle between the floor panel and the bottom panel such that a bottom edge of the elongated frame remains a substantially constant distance from the bottom panel.

2. The access system of claim 1, wherein the contour of at least one of the first track and the second track is curvilinear.

3. The access system of claim 1, wherein the first track and the second track are substantially aligned in a direction substantially perpendicular to a direction of travel of the ramp between the deployed and stowed positions.

4. The access system of claim 1, wherein at least one of the first follower and the second follower disengages from at least one of the first track and the second track at a predetermined tilt angle.

\* \* \* \* \*